(12) United States Patent
Hata et al.

(10) Patent No.: US 9,497,767 B2
(45) Date of Patent: Nov. 15, 2016

(54) WIRELESS COMMUNICATION APPARATUS, WIRELESS COMMUNICATION METHOD, AND COMPUTER-READABLE RECORDING MEDIUM

(71) Applicant: FUJITSU LIMITED, Kawasaki-shi, Kanagawa (JP)

(72) Inventors: Yoshiaki Hata, Nishitokyo (JP); Eiji Iimori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 14/503,722

(22) Filed: Oct. 1, 2014

(65) Prior Publication Data

US 2015/0105115 A1     Apr. 16, 2015

(30) Foreign Application Priority Data

Oct. 10, 2013   (JP) ................. 2013-213247

(51) Int. Cl.
| | |
|---|---|
| *H04B 7/00* | (2006.01) |
| *H04W 72/08* | (2009.01) |
| *H04W 28/02* | (2009.01) |
| *H04L 29/06* | (2006.01) |

(52) U.S. Cl.
CPC .......... *H04W 72/085* (2013.01); *H04L 69/162* (2013.01); *H04W 28/0231* (2013.01)

(58) Field of Classification Search
CPC .................................................. H04W 72/085
See application file for complete search history.

(56) References Cited

U.S. PATENT DOCUMENTS

| | | | |
|---|---|---|---|
| 2002/0168959 A1 | 11/2002 | Noguchi et al. | |
| 2008/0177872 A1* | 7/2008 | Vengroff ................. | H04L 67/02 709/223 |
| 2012/0208502 A1* | 8/2012 | Perras ................... | H04W 8/245 455/411 |
| 2013/0070601 A1 | 3/2013 | Shen | |
| 2013/0088961 A1 | 4/2013 | Ramachandran et al. | |
| 2013/0095806 A1 | 4/2013 | Salkintzis et al. | |
| 2013/0143542 A1 | 6/2013 | Kovvali et al. | |
| 2014/0226658 A1 | 8/2014 | Kakadia et al. | |
| 2015/0029956 A1* | 1/2015 | Moses ................... | H04W 76/02 370/329 |
| 2015/0100628 A1* | 4/2015 | LaPine ................ | H04M 3/5158 709/203 |

FOREIGN PATENT DOCUMENTS

| | | |
|---|---|---|
| EP | 1777925 | 4/2007 |
| EP | 1786151 | 5/2007 |
| EP | 2879428 A1 | 6/2015 |
| JP | 2002-335278 | 11/2002 |
| JP | 2008-136150 | 6/2008 |
| JP | 2011-166251 | 8/2011 |

OTHER PUBLICATIONS

EESR—The Extended European Search Report of European Patent Application No. 15158968.6 mailed Aug. 28, 2015.
Kim et al., "MAC-Level Measurement Based Traffic Distribution over IEEE 802.11 Multi-Radio Networks", IEEE Transactions on Consumer Electronics, IEEE Service Center, New York, US, vol. 54, no. 3, pp. 1185-1191, XP011235565.
EESR—Extended European Search Report of European Patent Application No. 14186684.8, mailed May 4, 2015.
US Office Action mailed Sep. 23, 2016 for co-pending U.S. Appl. No. 14/670,510, 19 pages.

* cited by examiner

*Primary Examiner* — Mohammed Rachedine
(74) *Attorney, Agent, or Firm* — Fujitsu Patent Center

(57) ABSTRACT

A mobile terminal measures a first wireless quality that is a wireless quality of a first communication network, and measures a second wireless quality that is a wireless quality of a second communication network. The mobile terminal then determines a ratio between the number of first sockets used for the first communication network and the number of second sockets used for the second communication network, based on the first wireless quality or the second wireless quality. The mobile terminal then generates the first sockets and the second sockets at the determined ratio and transmits data by using each of the generated sockets.

7 Claims, 10 Drawing Sheets

FIG.4

| THROUGHPUT LEVEL VALUE | RL1 | RL2 | RL3 | RL4 | RL5 | RL6 | RL7 | RL8 | RL9 | RL10 |
|---|---|---|---|---|---|---|---|---|---|---|
| THROUGHPUT VALUE | 0 TO X1 | X2 TO X3 | X4 TO X5 | X6 TO X7 | X8 TO X9 | X10 TO X11 | X12 TO X13 | X14 TO X15 | X16 TO X17 | X18 TO X19 |

FIG.6

APPLICATION DATA

LEVEL 3 [MOBILE (M): Wi-Fi (W)=7:3]

SOCKET M | SOCK-ET M | SOCK-ET W | SOCKET M | SOCKET W | SOCK-ET M | SOCKET W | SOCK-ET M | SOCK-ET M

FIG.10

| STATE NAME / EVENT | Wi-Fi CHECKING COMPLETION | PUBLIC Wi-Fi CONNECTION COMPLETION | Wi-Fi TRANSITION COMPLETION | Wi-Fi NETWORK CONGESTION | Wi-Fi CONGESTION CLEARANCE | QUALITY DETERIORATION IN Wi-Fi NETWORK | QUALITY DETERIORATION IN MOBILE NETWORK | MOBILE NETWORK CONGESTION | MOBILE CONGESTION CLEARANCE | Wi-Fi SPEED DETERIORATION | Wi-Fi SPEED RECOVERY | Wi-Fi AP SWITCH OVER |
|---|---|---|---|---|---|---|---|---|---|---|---|---|
| 1 CHECKING Wi-Fi NETWORK | ⇒TO 2 | ⇒TO 5 | - | - | - | - | - | - | - | - | - | - |
| 2 UNDER TRANSITION TO Wi-Fi NETWORK | - | - | ⇒TO 3 | ⇒TO 4 | - | ⇒TO 1 | ⇒TO 3 | • INCREASE Wi-Fi USAGE RATE | - | ⇒TO 6 | - | ⇒TO 1 |
| 3 CONNECTING TO Wi-Fi NETWORK | - | - | - | ⇒TO 4 | - | ⇒TO 1 | - | - | - | ⇒TO 6 | - | ⇒TO 1 |
| 4 LOAD BALANCING | - | - | - | - | ⇒TO 2 | ⇒TO 1 | ⇒TO 3 | - | - | - | - | ⇒TO 1 |
| 5 CONNECTING TO PUBLIC Wi-Fi NETWORK | - | - | - | ⇒TO 5 (SELF-TRANSITION) | - | ⇒TO 1 | - | - | - | ⇒TO 6 | - | ⇒TO 1 |
| 6 BLOCKING Wi-Fi CONNECTION | - | - | - | - | - | - | - | - | - | - | ⇒TO 1 | ⇒TO 1 |

WIRELESS COMMUNICATION APPARATUS, WIRELESS COMMUNICATION METHOD, AND COMPUTER-READABLE RECORDING MEDIUM

CROSS-REFERENCE TO RELATED APPLICATION

This application is based upon and claims the benefit of priority of the prior Japanese Patent Application No. 2013-213247, filed on Oct. 10, 2013, the entire contents of which are incorporated herein by reference.

FIELD

The embodiments discussed herein are related to a wireless communication apparatus, a wireless communication method, and a wireless communication program.

BACKGROUND

Recent mobile terminals, such as smartphones, have a communication unit that connects to cellular networks in conformity with such telecommunication standards as Long Term Evolution (LTE) and 3rd Generation (3G), and a communication unit that connects to wireless local area networks (LANs) based on Wireless Fidelity (Wi-Fi) and other technologies.

Under the communication environment connectable to both the cellular networks and the wireless LANs, the mobile terminals generally connect to the wireless LANs with higher priority. When the mobile terminals are out of wireless LAN service range, access to the wireless LANs is switched to access to the cellular networks to perform communication. Thus, the mobile terminals perform communication by automatically switching the network to be used.

Patent Literature 1: Japanese Laid-open Patent Publication No. 2002-335278
Patent Literature 2: Japanese Laid-open Patent Publication No. 2008-136150
Patent Literature 3: Japanese Laid-open Patent Publication No. 2011-166251

However, in conventional technology, communication interruption temporarily occurs at the time of switching the network to be used. In the case where a cellular network is automatically switched to a Wi-Fi network, a throughput deteriorates when the Wi-Fi network is crowded, and/or when a distance to an access point is long. Thus, automatic switchover of the network in the conventional technology is not necessarily convenient for users.

SUMMARY

According to an aspect of the embodiment, a wireless communication apparatus includes a memory, and a processor connected to the memory wherein the processor executes a process. A Process includes first measuring a first wireless quality that is a wireless quality of a first communication network; second measuring a second wireless quality that is a wireless quality of a second communication network; determining a ratio between the number of first sockets used for the first communication network and the number of second sockets used for the second communication network, based on the first wireless quality or the second wireless quality; and generating the first sockets and the second sockets at the ratio determined at the determining and transmitting data by using each of the generated sockets.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory view illustrating throughput levels;
FIG. 6 is an explanatory view illustrating an example of socket generation;
FIG. 10 is an explanatory view illustrating the relation between the state transition of the mobile terminal and events.

DESCRIPTION OF EMBODIMENTS

Preferred Embodiments of the Present Invention will be explained with reference to accompanying drawings. It is to be understood that the embodiments are not intended to limit the present embodiment. The respective embodiments may properly be combined without causing inconsistency.

Figure 1:
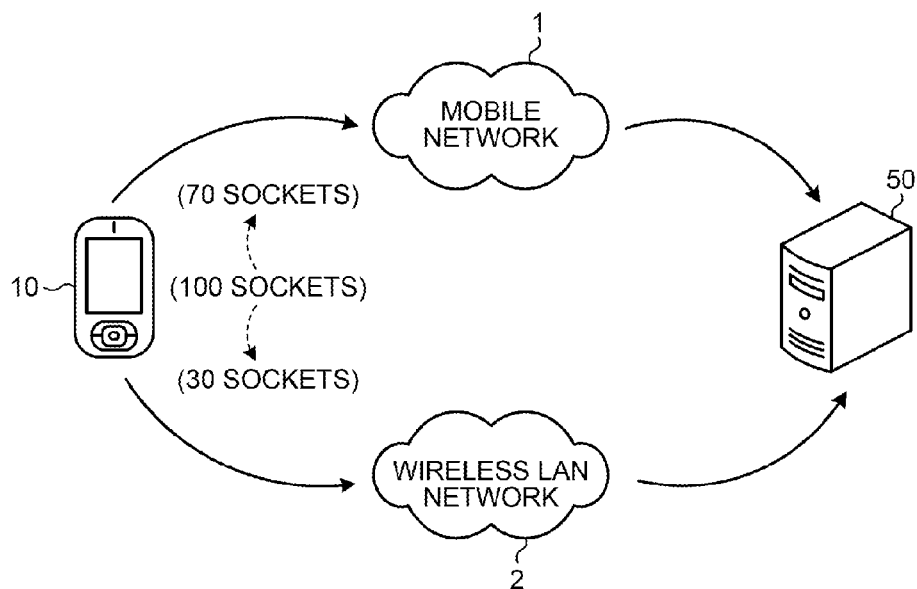
FIG. 1 illustrates an example of the overall configuration of a system according to a first embodiment.

[a] First Embodiment
Overall Configuration
FIG. 1 illustrates an example of the overall configuration of a system according to a first embodiment. As illustrated in FIG. 1, this system includes a mobile terminal 10 and a server 50, which are connected to each other so that they can perform communication with each other via a mobile network 1 and a wireless LAN network 2. Examples of the mobile network 1 include LTE networks and 3G networks. Examples of the wireless LAN network 2 include Wi-Fi networks and WiMAX networks. The number of illustrated mobile terminals and servers is merely illustrative and not exclusive. In the embodiments, a Wi-Fi network and an LTE network are used as an example.

The mobile terminal 10 executes an application to perform communication with the server 50. Examples of the mobile terminal 10 include a smartphone, a cellular phone, and a notebook computer. The mobile terminal 10 has an antenna for each of the communication networks so as to be able to perform communication by using the respective communication networks at the same time. The server 50 provides the mobile terminal 10 with various services. Examples of the server 50 include a Web server and an application server.

In such situations, the mobile terminal 10 measures a first wireless quality that is a Wi-Fi wireless quality, and measures a second wireless quality that is an LTE wireless quality. Then, the mobile terminal 10 determines a ratio between the number of first sockets used for a Wi-Fi network and the number of second sockets used for an LTE network, based on the first wireless quality or the second wireless quality. The mobile terminal 10 then generates the first sockets and the second sockets at the ratio determined by a determination unit and transmits data by using each of the generated sockets.

For example, assume that the mobile terminal 10 determines the ratio between the Wi-Fi network and the LTE network to be 3:7. In this case, out of ten sockets used in an application A, the mobile terminal 10 uses three sockets for transmission through a channel via the Wi-Fi network and uses seven sockets for transmission through a channel via the LTE network.

More specifically, the mobile terminal 10 establishes a connection to the Wi-Fi network by using a Wi-Fi Internet Protocol (IP) address and a port number used by the application A, as well as a Wi-Fi IP address of the server 50 and a port number of the server 50 used by the application A. Then, the mobile terminal 10 opens the sockets, and writes data therein. The written data is read by the server 50 side. The server 50 sends a reply to the request from the mobile terminal 10, and the mobile terminal 10 receives data by using the same sockets. When communication between the mobile terminal and the server is completed, the sockets are closed. Out of total ten sockets, the mobile terminal 10 uses three sockets to perform three socket communications in the Wi-Fi network to transmit data.

The mobile terminal 10 establishes a connection to the LTE network by using an LTE IP address and a port number used by the application A as well as an LTE IP address of the server 50 and a port number of the server 50 used by the application A. Then, the mobile terminal 10 opens the sockets, and writes data therein. The written data is read by the server 50 side. The server 50 sends a reply to the request from the mobile terminal 10, and the mobile terminal 10 receives data by using the same sockets. When communication between the mobile terminal and the server is completed, the sockets are closed. Out of total ten sockets, the mobile terminal 10 uses seven sockets to perform seven socket communications in the LTE network to transmit data.

Thus, at the time of transmitting application data, the mobile terminal 10 increases the number of Wi-Fi sockets until Wi-Fi communication is stabilized. Since communication is performed by using both the Wi-Fi sockets and the LTE sockets at the same time, communication interruption at the time of network switchover is suppressed and user convenience is enhanced.

Hardware Configuration

Figure 2:
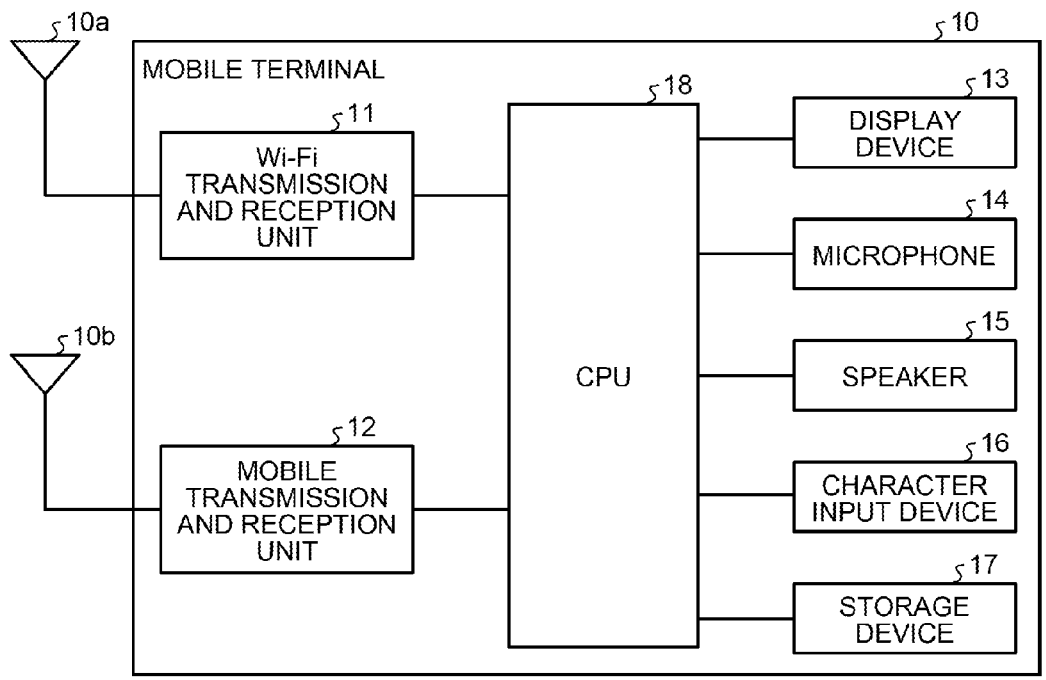
FIG. 2 illustrates an example of the hardware configuration in a mobile terminal according to the first embodiment.

FIG. 2 illustrates an example of the hardware configuration in a mobile terminal according to the first embodiment. As illustrated in FIG. 2, the mobile terminal 10 has a Wi-Fi transmission and reception unit 11, a mobile transmission and reception unit 12, a display device 13, a microphone 14, a speaker 15, a character input device 16, a storage device 17, and a central processing unit (CPU) 18.

The Wi-Fi transmission and reception unit 11 performs communication via the wireless LAN network 2, such as a Wi-Fi network, by using an antenna 10a. The Wi-Fi transmission and reception unit 11 has an IP address set for the Wi-Fi network. The Wi-Fi transmission and reception unit 11 uses this IP address to establish a connection to the server 50 and performs data transmission and reception.

The mobile transmission and reception unit 12 performs communication via the mobile network 1, such as an LTE network, by using an antenna 10b. The mobile transmission and reception unit 12 has an IP address set for the LTE network. The mobile transmission and reception unit 12 uses this IP address to establish a connection to the server 50 and performs data transmission and reception.

Examples of the display device 13 include a touch panel and a display unit to display a variety of information pieces. The microphone 14 collects sound and inputs the sound into the CPU 18. The speaker 15 outputs the sound inputted from the CPU 18.

The character input device 16 is an input device using a keyboard and/or a touch panel to receive various inputs from a user and to output them to the CPU 18. The storage device 17 is a storage such as a memory and a hard disk, which stores programs executed by the CPU 18, processing results generated from the programs and the like executed by the CPU 18, various tables, and the like.

The CPU 18 is a processing unit that controls the entire processing of the mobile terminal 10. The CPU 18 reads the programs from the storage device 17 and executes processes. For example, the CPU 18 executes processing processes described in FIG. 3 and subsequent drawings. The CPU 18 may be made up of two or more processing units.

Function Configuration

Figure 3:
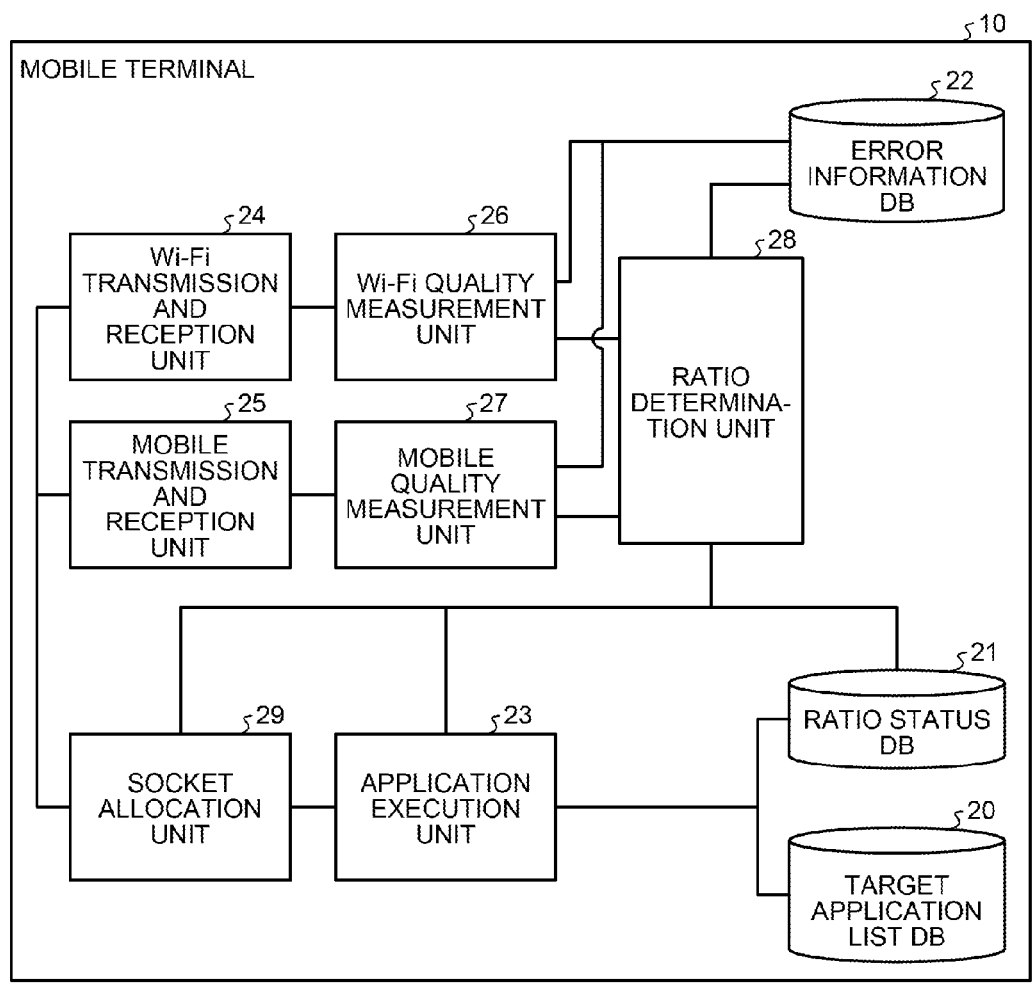
FIG. 3 is a functional block diagram illustrating the configuration of functions included in the mobile terminal according to the first embodiment.

FIG. 3 is a functional block diagram illustrating the configuration of functions included in the mobile terminal according to the first embodiment. As illustrated in FIG. 3, the mobile terminal 10 has a target application list DB 20, a ratio status DB 21, an error information DB 22, an application execution unit 23, a Wi-Fi transmission and reception unit 24, and a mobile transmission and reception unit 25. The mobile terminal 10 also has a Wi-Fi quality measurement unit 26, a mobile quality measurement unit 27, a ratio determination unit 28, and a socket allocation unit 29.

The target application list DB 20, the ratio status DB 21, and the error information DB 22 are data bases to be stored in a storage such as the storage device 17 of FIG. 2. The application execution unit 23, the Wi-Fi quality measurement unit 26, the mobile quality measurement unit 27, the ratio determination unit 28, the socket allocation unit 29, and the like are one examples of the processes and the like executed by the CPU 18.

The target application list DB 20 is a data base to store a list of the applications which perform communication by using two communication networks at the same time. In other words, the applications stored in the target application list DB 20 are subjected to the processing described in this embodiment. The information stored in the target application list DB 20 is preset by a user and the like.

The ratio status DB 21 stores a current ratio status of each application.

Specifically, the ratio status DB 21 stores a transition level as a ratio between Wi-Fi sockets and LTE sockets for an application in operation.

A level 1 represents a ratio of Wi-Fi sockets and LTE sockets=1:9, a level 2 represents a ratio of Wi-Fi sockets and LTE sockets=2:8, a level 3 represents a ratio of Wi-Fi sockets and LTE sockets=3:7, and a level 4 represents a ratio of Wi-Fi sockets and LTE sockets=4:6. A level 5 represents a ratio of Wi-Fi sockets and LTE sockets=5:5, a level 6 represents a ratio of Wi-Fi sockets and LTE sockets=6:4, and a level 7 represents a ratio of Wi-Fi sockets and LTE sockets=7:3. A level 8 represents a ratio of Wi-Fi sockets and LTE sockets=8:2, a level 9 represents a ratio of Wi-Fi sockets and LTE sockets=9:1, and a level 10 represents a ratio of Wi-Fi sockets and LTE sockets=10:0.

More specifically, when the level value is 2, out of ten sockets to be used by the application, there are two sockets used via the Wi-Fi network and eight sockets used via the LTE network. When the level value is 10, all the data of the application is transmitted by using the sockets that are used via the Wi-Fi network. The information stored in the ratio status DB 21 is updated by the later-described ratio determination unit 28.

The error information DB 22 stores error information of the data transmitted by socket communication. Specifically, the error information DB 22 stores, for each application, information on a socket where the error has occurred, in association with information on the data. Examples of the information on the socket include an identifier that identifies the socket. Examples of the information on the data include information that identifies the data.

The application execution unit 23 is a processing unit that executes applications. Specifically, in accordance with an instruction and operation by the user, the application execution unit 23 reads a program of an application desired by the user, from the storage device 17 and the like. The application execution unit 23 then loads the program in the memory, and executes the application.

The Wi-Fi transmission and reception unit 24 is a processing unit that generates the sockets used for the Wi-Fi network and performs data transmission and reception by using the Wi-Fi network. Specifically, the Wi-Fi transmission and reception unit 24 establishes a connection to the server 50 on the Wi-Fi network, and transmits data to the server 50 with use of the sockets.

For example, the Wi-Fi transmission and reception unit 24 performs data write to the sockets by using the connection established between the mobile terminal 10 and the server 50. The written data is read by the server 50 side. The server 50 sends a reply to the request from the mobile terminal 10, and the mobile terminal 10 receives data by using the same sockets. When communication between the mobile terminal and the server is completed, the sockets are closed. The Wi-Fi transmission and reception unit 24 uses the connection established between the mobile terminal 10 and the server 50 to allow data write to the sockets to be performed by the server 50 side. The server 50 sends a reply to the request from the mobile terminal 10, and the mobile terminal 10 receives data by using the same sockets. When the communication between the mobile terminal and the server is completed, the data is read from the sockets. Thus, the Wi-Fi transmission and reception unit 24 performs data transmission and reception through the socket communication via the Wi-Fi network.

The mobile transmission and reception unit 25 is a processing unit that generates the sockets used for the LTE network and performs data transmission and reception by using the LTE network. Specifically, the mobile transmission and reception unit 25 establishes a connection to the server 50 on the LTE network, and transmits data to the server 50 with use of the sockets.

For example, the mobile transmission and reception unit 25 performs data write to the sockets by using the connection established between the mobile terminal 10 and the server 50. The written data is read by the server 50 side. The server 50 sends a reply to the request from the mobile terminal 10, and the mobile terminal 10 receives data by using the same sockets. When the communication between the mobile terminal and the server is completed, the sockets are closed. When data write to the sockets is performed by the server 50 side, the mobile transmission and reception unit 25 reads the data from the sockets by using the connection established between the mobile terminal 10 and the server 50. Thus, the mobile transmission and reception unit 25 performs data transmission and reception through the socket communication via the LTE network.

The Wi-Fi quality measurement unit 26 is a processing unit that measures a Wi-Fi wireless quality. Specifically, the Wi-Fi quality measurement unit 26 acquires from the socket communication using the Wi-Fi network an actual measurement throughput, a received signal strength indication (RSSI), a link speed that is an upper limit of the throughput, a data exchange amount per socket, a service set identifier (SSID) in use, and the like.

For example, the Wi-Fi quality measurement unit 26 calculates an actual measurement throughput (bps) as a traffic per unit time, based on the data volume and transmission time per socket. The Wi-Fi quality measurement unit 26 measures the RSSI of reception signals. Since the magnitude of a signal level is in weak relationship with the transmission speed, a higher transmission speed is expected as the RSSI is stronger.

The Wi-Fi quality measurement unit 26 identifies the link speed based on the type of the Wi-Fi network in use. The link speed is a theoretical speed of the Wi-Fi connection between the mobile terminal and an access point. The link speed changes depending on the connection status. The actual measurement throughput does not surpass the link speed.

The Wi-Fi quality measurement unit 26 calculates a sum total of the amount of data exchanged with I/O functions, such as read( ) and write( ) in each socket used in the Wi-Fi network. The sum total is used as the data exchange amount per socket. The Wi-Fi quality measurement unit 26 also extracts an SSID from the identifiers included in the Wi-Fi wireless communication.

The Wi-Fi quality measurement unit 26 determines the throughput level based on values of the actual measurement throughput, the link speed, and the like. FIG. 4 is an explanatory view illustrating the throughput levels. As illustrated in FIG. 4, the throughput level value can be identified with a throughput actual measurement value. In the case of FIG. 4, when the throughput value is in the range of "0 to X1," the throughput level value is identified as "RL1." When the throughput value is in the range of "X8 to X9," the throughput level value is identified as "RL5."

The mobile quality measurement unit 27 is a processing unit that measures the wireless quality of the mobile network 1. Specifically, the mobile quality measurement unit 27 acquires from the socket communication using the mobile network 1 an actual measurement throughput, an RSSI, a network type, a data exchange amount per socket, and the like.

For example, the mobile quality measurement unit 27 calculates an actual measurement throughput (bps) as a traffic per unit time, based on the data volume and transmission time per socket. The mobile quality measurement unit 27 measures the RSSI of reception signals. The mobile quality measurement unit 27 identifies a telecommunications standard from the type of the mobile communication network in use, and identifies whether the network type is LTE or 3G. The mobile quality measurement unit 27 calculates a sum total of the amount of data exchanged with I/O functions, such as read( ) and write( ) in each socket used in the mobile network, and uses the sum total as a data exchange amount per socket.

The mobile quality measurement unit 27 also determines the throughput level based on the actual measurement throughput value as in the case of FIG. 4. The throughput values and the like, which are used to define the Wi-Fi throughput levels and/or the mobile network throughput levels, may arbitrarily be changed.

The ratio determination unit 28 is a processing unit that determines a ratio between the number of the sockets used for the Wi-Fi network and the number of the sockets used for the LTE network, based on the Wi-Fi wireless quality or the LTE wireless quality. Specifically, the ratio determination unit 28 determines the level value representing the ratio, based on which wireless quality is improved, the Wi-Fi wireless quality or the LTE wireless quality. The ratio determination unit 28 then stores the determined level value in the ratio status DB 21. More specifically, the ratio determination unit 28 determines a ratio to distribute the data of one application to the Wi-Fi network and the LTE network in units of a socket.

For example, when communication of an application registered in the target application list DB 20 occurs, the ratio determination unit 28 increases the Wi-Fi socket rate as the wireless quality of the Wi-Fi network is getting better. When the wireless quality of the Wi-Fi network is stabilized at high quality, the ratio determination unit 28 stops using the LTE sockets, and transmits all the data with the Wi-Fi sockets.

In one example, when a high RSSI is maintained, stable communication can be expected with higher probability. Accordingly, in order to shorten the time of transmission from LTE communication to Wi-Fi communication, the ratio determination unit 28 shifts the transition level by a specified number that is not 1 but 2 or larger. Moreover, when a low RSSI is maintained and/or when the RSSI is not constant, communication becomes unstable with higher probability. Accordingly, in order to lengthen the time of transition from the LTE communication to the Wi-Fi communication, the ratio determination unit 28 shifts the transition level one level at a time.

Figure 5:
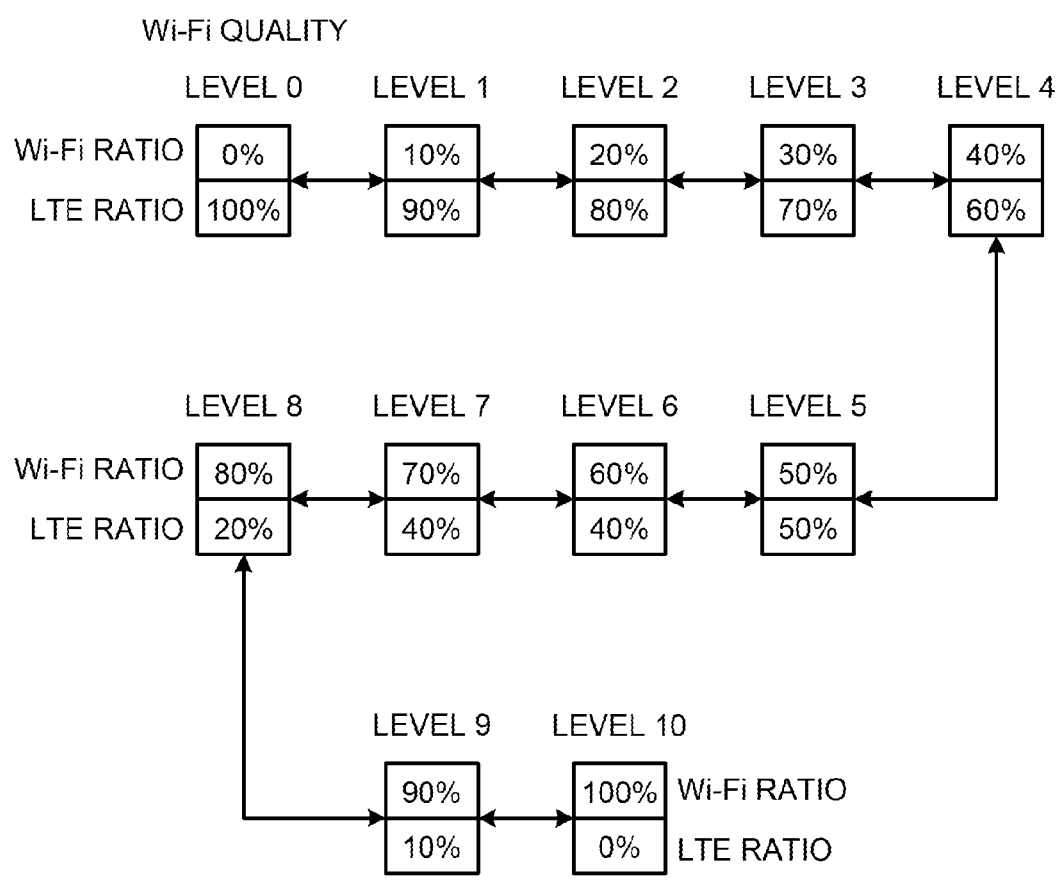
FIG. 5 is an explanatory view illustrating an example of change in transition level.

A description will now be given of the relation between change in transition level and change in socket generation ratio with reference to FIG. 5. FIG. 5 is an explanatory view illustrating an example of change in transition level. FIG. 5 illustrates an example in which the transition level changes one level at a time in accordance with the Wi-Fi wireless quality in the state where the Wi-Fi wireless quality changes while the LTE wireless quality is constant.

As illustrated in FIG. 5, when an application is started, the ratio determination unit 28 starts at the transition level 0 where the LTE socket rate is 100%. Then, if the Wi-Fi quality improves at the next timing, the ratio determination unit 28 increases the transition level to the level 1 where the Wi-Fi socket rate is changed to 10% and the LTE socket rate is changed to 90%.

If the Wi-Fi quality further improves in the state of the transition level 1 at the next timing, the ratio determination unit 28 increases the transition level to the level 2 where the Wi-Fi socket rate is changed to 20% and the LTE socket rate is changed to 80%. If the Wi-Fi quality deteriorates, the ratio determination unit 28 decreases the transition level to the level 0 where the Wi-Fi socket rate is changed to 0% and the LTE socket rate is changed to 100%.

If the Wi-Fi quality further improves in the state of the transition level 2 at the next timing, the ratio determination unit 28 increases the transition level to the level 3 where the Wi-Fi socket rate is changed to 30% and the LTE socket rate is changed to 70%. If the Wi-Fi quality deteriorates, the ratio determination unit 28 decreases the transition level to the level 1 where the Wi-Fi socket rate is changed to 10% and the LTE socket rate is changed to 90%.

Thus, the ratio determination unit 28 measures the Wi-Fi quality at each transition level, and if the Wi-Fi quality improves, the transition level is increased so as to increase the number of Wi-Fi sockets and to decrease the number of LTE sockets. If the Wi-Fi quality deteriorates, the ratio determination unit 28 decreases the transition level so as to decrease the number of Wi-Fi sockets and to increase the number of LTE sockets.

In the case where the Wi-Fi wireless quality is constant while the LTE wireless quality changes, the transition level may also be shifted in a similar manner to change the socket rate. For example, the ratio determination unit 28 measures the LTE quality at each transition level, and if the LTE quality improves, the transition level is decreased so as to increase the number of LTE sockets and to decrease the number of Wi-Fi sockets. If the LTE quality deteriorates, the ratio determination unit 28 increases the transition level so as to increase the number of Wi-Fi sockets and to decrease the number of LTE sockets.

The socket allocation unit 29 is a processing unit that distributes the sockets at the ratio determined by the ratio determination unit 28. Specifically, the socket allocation unit 29 refers to the ratio status DB 21 and identifies the transition level which represents the current distribution status of an application that performs communication. The socket allocation unit 29 then allocates sockets to the respective transmission and reception units at the ratio corresponding to the identified transition level.

FIG. 6 is an explanatory view illustrating an example of socket generation. FIG. 6 illustrates an allocation example in the case where the transition level representing the ratio is level 3. In FIG. 6, the number of Wi-Fi sockets: the number of LTE sockets=3:7.

As illustrated in FIG. 6, when one application data is transmitted by using ten sockets, the socket allocation unit 29 allocates seven sockets M that are LTE sockets to the mobile transmission and reception unit 25. The socket allocation unit 29 also allocates three sockets W that are Wi-Fi sockets to the Wi-Fi transmission and reception unit 24.

The data pieces transmitted with the respective sockets may be different in volume. More specifically, the volumes of data pieces transmitted by the respective sockets may vary. For example, since the socket allocation unit 29 allocates each socket based on the configuration of application data, the sockets are generated not dependent on the sockets but dependent on the application.

The socket allocation unit 29 can arbitrarily set an order of allocation and a ratio of the Wi-Fi sockets and the LTE sockets to be allocated. For example, the socket allocation unit 29 may use a round-robin scheme to allocate the Wi-Fi sockets and the LTE sockets at a ratio of 1:1. The socket allocation unit 29 may also determine the order of allocation for each transition level in advance.

The socket allocation unit 29 may use the round-robin scheme to sequentially distribute the sockets in accordance with a preset distribution ratio. For example, in the case of the transition level 7, the socket allocation unit 29 may allocate "1st, 3rd, 4th, 6th, 7th, 8th and 10th data sets" to the Wi-Fi transmission and reception unit 24, while allocating "2nd, 5th and 9th data sets" to the mobile transmission and reception unit 25.

Thus, the socket allocation unit 29 allocates one application to two channels, i.e., two types of sockets, for data transmission.

Overall Flow of Processing

Figure 7:
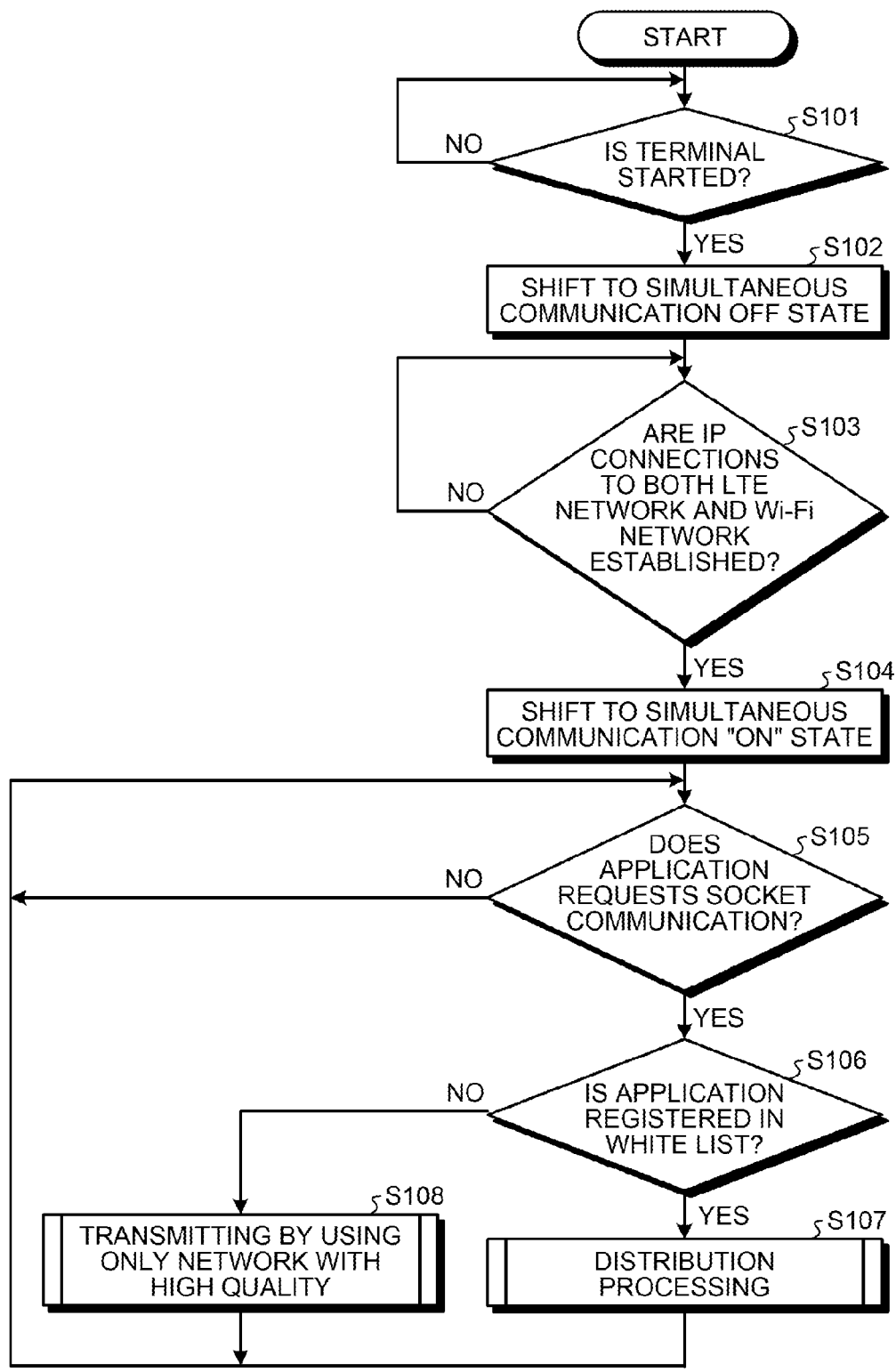
FIG. 7 is a flow chart illustrating the flow of processing performed by the mobile terminal.

FIG. 7 is a flow chart illustrating the flow of processing executed by the mobile terminal.

As illustrated in FIG. 7, when the mobile terminal 10 is started (Step S101: Yes), the ratio determination unit 28 of the mobile terminal 10 shifts to a simultaneous communication OFF state (Step S102). In other words, the mobile terminal 10 is in the state of using the LTE communication only.

Then, when the mobile terminal 10 has established IP connections to both the LTE network and the Wi-Fi network (Step S103: Yes), the ratio determination unit 28 shifts to a simultaneous communication ON state (Step S104). More specifically, when an LTE IP address and a Wi-Fi IP address are allocated, the ratio determination unit 28 starts simultaneous distribution to the LTE network and the Wi-Fi network.

If the application requests socket communication (Step S105: Yes), the ratio determination unit 28 determines whether or not the request source application is registered in the target application list DB 20 (Step S106).

If the request source application is registered in the target application list DB 20 (Step S106: Yes), the ratio determination unit 28 executes distribution processing described in FIG. 8 (Step S107).

If the request source application is not registered in the target application list DB 20 (Step S106: No), the ratio determination unit 28 performs data transmission by using only the transmission network with high quality (Step S108). When the transmission network to be used by the request source application is set in advance, the ratio determination unit 28 performs data transmission by using only the preset transmission network.

Flow of Distribution Processing

Figure 8:
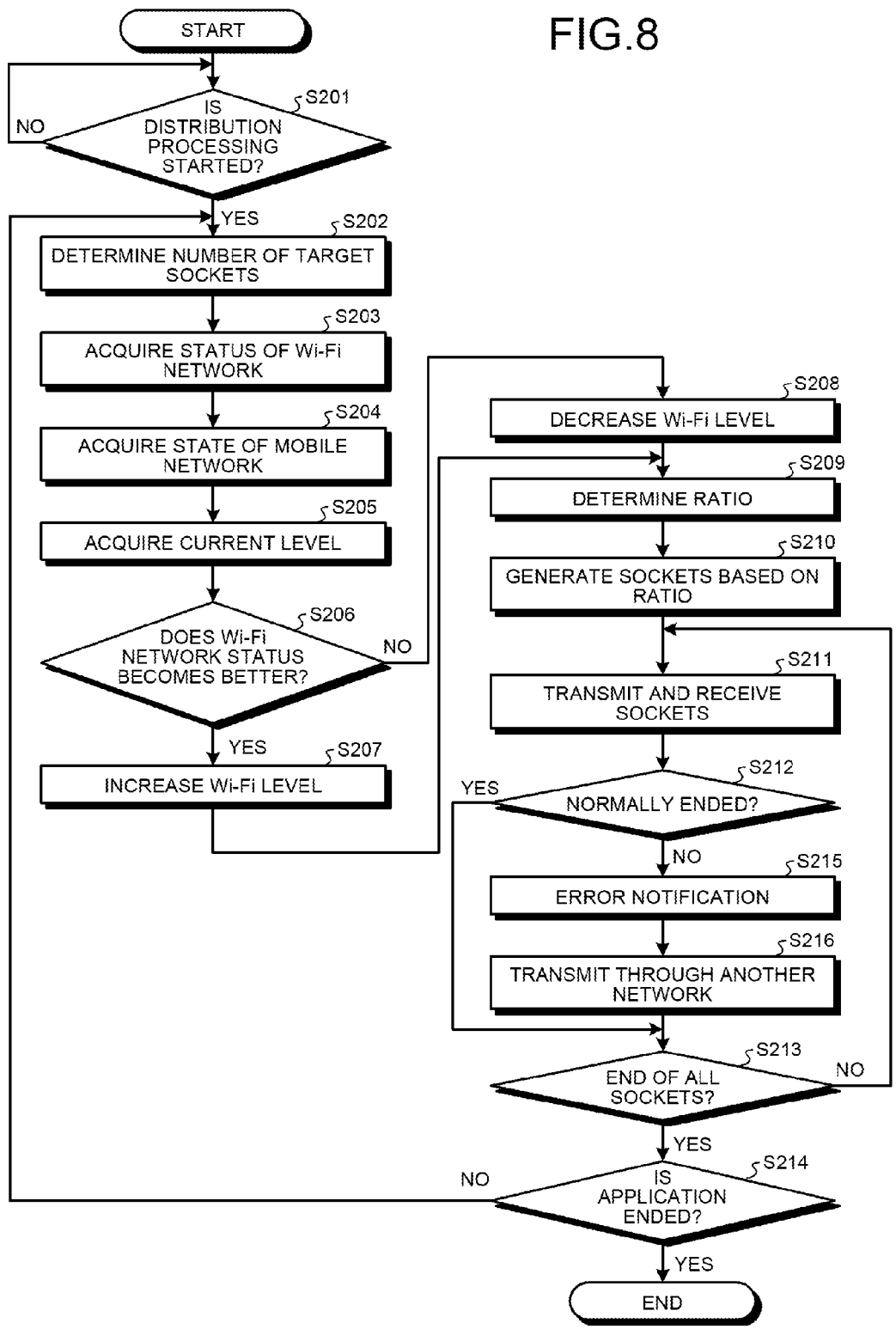
FIG. 8 is a flow chart illustrating the flow of distribution processing performed by the mobile terminal.

FIG. 8 is a flow chart illustrating the flow of distribution processing executed by the mobile terminal. As illustrated in FIG. 8, when the distribution processing is started (Step S201: Yes), the ratio determination unit 28 of the mobile terminal 10 determines the number of sockets for communication (Step S202). Specifically, based on the data volume requested from the application, the ratio determination unit 28 determines the total number of sockets to be used for the data.

Next, the Wi-Fi quality measurement unit 26 acquires the status of the Wi-Fi network from the previous Wi-Fi communication and the like (Step S203). In a similar manner, the mobile quality measurement unit 27 acquires the status of the mobile network such as the LTE network, from the previous mobile communication and the like (Step S204).

Then, the ratio determination unit 28 refers to the information stored in the ratio status DB 21 and acquires a current transition level of the application (Step S205).

If the acquired current status of the Wi-Fi network is better than the previous status (Step S206: Yes), the ratio determination unit 28 increases the Wi-Fi transition level (Step S207). More specifically, the ratio determination unit 28 increases the level so that the number of Wi-Fi sockets is increased.

If the acquired current status of the Wi-Fi network is worse than the previous status or is unchanged (Step S206: No), the ratio determination unit 28 decreases the Wi-Fi transition level (Step S208). More specifically, the ratio determination unit 28 decreases the transition level so that the number of Wi-Fi sockets is decreased.

In accordance with the transition level determined in Step S207 or Step S208, the ratio determination unit 28 determines the ratio between the number of Wi-Fi sockets and the number of LTE sockets (Step S209).

Then, the socket allocation unit 29 or each transmission and reception unit generates sockets at the ratio determined by the ratio determination unit 28 (Step S210). Each of the transmission and reception units then transmits and receives data by using the sockets generated correspondingly thereto (Step S211). For example, the socket allocation unit 29 allocates data of the application to one of the transmission and reception units in accordance with the transition level. The allocated transmission and reception unit establishes a connection to the server 50 and transmits the data with the sockets.

When data transmission with the sockets is normally completed (Step S212: Yes), the socket allocation unit 29 or each of the transmission and reception units determines whether or not all the socket communications are completed (Step S213).

When all the socket communications are completed (Step S213: Yes), the ratio determination unit 28 determines whether or not the application is ended (Step S214). When the application is ended (Step S214: Yes), the ratio determination unit 28 ends the distribution processing. When the application is still operating (Step S214: No), the ratio determination unit 28 returns to Step S202 to execute the same processing for the next application data. When an unprocessed socket communication is present (Step S213: No), the ratio determination unit 28 returns to Step S211 to executes processing of the next socket.

If data transmission with the sockets is not normally completed in Step S212 (Step S212: No), each transmission and reception unit performs error notification that includes storing error information in the error information DB 22 and displaying the error information on a display unit and the like (Step S215).

Then, the transmission and reception unit, which detected transmission error, requests another transmission and reception unit to retry failed data transmission. The requested transmission and reception unit identifies the data whose transmission has failed by referring to the error information DB 22 and retransmits the data (Step S216). In other words, the data whose transmission has failed is retransmitted by socket communication using a network different from the network where the error occurred. The data may be retransmitted after all the socket communications determined in Step S202 are completed, or may be retransmitted at an arbitrary timing.

State Transition

Figure 9:
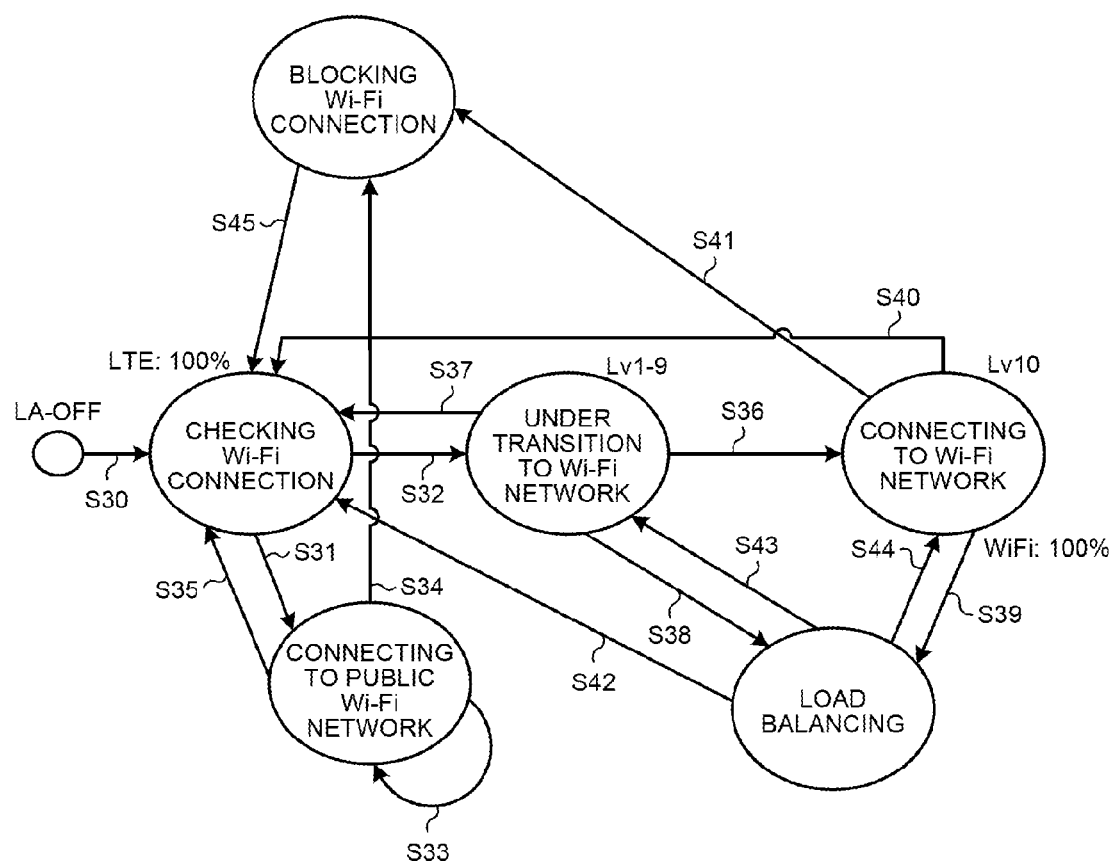
FIG. 9 is an explanatory view illustrating state transition of the mobile terminal.

A description will now be given of the transition states of the mobile terminal 10 in socket communication. FIG. 9 is an explanatory view illustrating state transition of the mobile terminal. As illustrated in FIG. 9, the state of the mobile terminal 10 changes in accordance with the radio conditions of the Wi-Fi network and/or the LTE network. The state of the mobile terminal 10 includes checking Wi-Fi connection, connecting to public Wi-Fi network, under transition to Wi-Fi network, load balancing, connecting to Wi-Fi network, and blocking Wi-Fi connection. The respective states, their transition conditions, and the like will be described.

Checking Wi-Fi Connection

The mobile terminal 10 shifts to the state of checking Wi-Fi connection after the mobile terminal 10 is started (S30). In this state, all the communications of the applications included in the target application list are distributed to the LTE network. In other words, the number of Wi-Fi sockets: the number of LTE sockets=0:10 in this state.

In this state, the mobile terminal 10 checks whether or not information on the Wi-Fi network has been acquired, whether or not the Wi-Fi quality is in an allowable range, and whether or not the connected Wi-Fi network is a public Wi-Fi network. The mobile terminal 10 maintains the state of checking Wi-Fi connection until the above check items are checked.

Once the mobile terminal 10 detects establishment of a connection to the public Wi-Fi network based on the SSID of the access point and the like, the mobile terminal 10 shifts to the state of "connecting to public Wi-Fi network" (S31). When the mobile terminal 10 detects that the connected Wi-Fi network is a general Wi-Fi network and the Wi-Fi quality is equal to or higher than a lower limit, the mobile terminal 10 shifts to the state of "under transition to Wi-Fi network" (S32).

Connecting to Public Wi-Fi Network

In the state of connecting to Wi-Fi network, the mobile terminal 10 is in connection to the public Wi-Fi network. The Wi-Fi transition level starts at the level 1 and is increased to the level 10 in the end. More specifically, in this state, the Wi-Fi transition level is increased and the number of Wi-Fi sockets is increased as the quality of the Wi-Fi network is getting better.

When a certain transition level is used, for example, 10 times in a row for distribution, the mobile terminal 10 increases the level by 1 for distribution. If the quality deteriorates after the transition level is increased, the transition level is decreased by 1 (S33).

When the public Wi-Fi quality becomes lower than the lower limit, the mobile terminal 10 shifts to the state of "blocking Wi-Fi connection" (S34). When the quality deteriorates after the transition level is increased, the mobile terminal 10 decreases the transition level by 1, whereas when the public Wi-Fi quality deteriorates such that the throughput decreases by a specified value or more in certain seconds, the mobile terminal 10 shifts to the state of "checking Wi-Fi connection" (S35).

Under Transition to Wi-Fi Network

In the state of under transition to Wi-Fi network, a usage rate of the Wi-Fi network is gradually increased until the mobile terminal establishes a complete connection to the Wi-Fi network. The Wi-Fi transition level starts at the level 1 and is increased to the level 10 in the end. More specifically, in this state, the Wi-Fi transition level is increased and the number of Wi-Fi sockets is increased as the above-stated quality of the Wi-Fi network is getting better.

When a certain transition level is used, for example, 10 times in a row for distribution, the mobile terminal 10 increases the level by 1 for distribution (S36). Generally, the mobile terminal 10 determines the quality of the Wi-Fi network every 10 sockets and increases the transition level by one level at a time. However, in the case where the RSSI and the link speed of the Wi-Fi network exceed specified values, the transition level may be increased by two or three levels at a time. More specifically, when the quality of the Wi-Fi network is sufficiently high in spite of the low transition level, the mobile terminal 10 increases the transition level by a large increment to achieve swift switchover to the Wi-Fi network.

When the quality deteriorates after the transition level is increased, the mobile terminal 10 decreases the transition level by 1, whereas when the Wi-Fi quality deteriorates such that the throughput decreases by a specified value or more in certain seconds, the mobile terminal 10 shifts to the state of "checking Wi-Fi connection" (S37). For example, when a throughput level value RLX (X=1 to 10) illustrated in FIG. 4 is decreased by four or more levels at a time, the mobile terminal 10 shifts to the state of "checking Wi-Fi connection." This state transition corresponds to the case where, for example, the mobile terminal 10 is out of the Wi-Fi network service range.

When transmission of the data having a specified volume or more is performed by using the Wi-Fi sockets, the mobile terminal 10 shifts to the state of "load balancing" (S38). For example, when a Wi-Fi communication of 3 Mbytes in one socket occurs, the mobile terminal 10 lowers the Wi-Fi network usage rate to suppress the occurrence of congestion.

Connecting to Wi-Fi Network

In the state of connecting to Wi-Fi network, all the communications of the applications included in the target application list are distributed to the Wi-Fi network. In this state, the mobile terminal 10 is in a complete connection to the Wi-Fi network, and communication is constantly performed at an off-load rate (Wi-Fi network usage rate) of 100%. In other works, the number of Wi-Fi sockets: the number of LTE sockets=10:0 in this state.

When transmission of the data having a specified volume or more is performed by using the Wi-Fi sockets in this state, the mobile terminal 10 shifts to the state of "load balancing" (S39). For example, when a Wi-Fi communication of 3M bytes in one socket occurs, the mobile terminal 10 lowers the Wi-Fi network usage rate to suppress the occurrence of congestion.

When the throughput and the link speed of the Wi-Fi network become lower than specified values, or when the throughput decreases by a specified value or more in certain seconds, the mobile terminal 10 shifts to the state of "checking Wi-Fi connection" (S40). For example, when the throughput of the Wi-Fi network is RL3 or lower and the link speed is RL5 or lower in terms of the level value illustrated in FIG. 4, the mobile terminal 10 shifts to the state of "checking Wi-Fi connection." The mobile terminal 10 also shifts to the state of "checking Wi-Fi connection" in the case where, for example, the throughput level is decreased by four levels or more at a time because the mobile terminal 10 is out of the Wi-Fi network service range.

When the speed of a backbone network between a Wi-Fi access point and the server is not sufficiently high, the mobile terminal 10 shifts to the state of "blocking Wi-Fi connection" (S41). In short, the mobile terminal 10 blocks the Wi-Fi connection when a sufficiently high Wi-Fi network speed is not obtained.

Load Balancing

In the state of load balancing, some of the Wi-Fi communications are assigned to the mobile network, such as the LTE network, to distribute the load of the Wi-Fi network. More specifically, in this state, data of a large volume is transmitted in a certain Wi-Fi socket communication and this causes congestion of the Wi-Fi network.

In this state, the number of Wi-Fi sockets: the number of LTE sockets=0:10. More specifically, the mobile terminal 10 transmits data subsequent to the congestion-causing data by using sockets of the mobile network even if the Wi-Fi sockets are allocated thereto.

When the mobile terminal 10 is using not the LTE network but the 3G network as the mobile network at the timing of the mobile terminal 10 shifting to the state of "load balancing," the mobile terminal 10 shifts to the state of "checking Wi-Fi connection" (S42).

When the mobile terminal 10 detects that congestion is cleared after the mobile terminal 10 shifts from the state of "under transition to Wi-Fi network" to the state of "load balancing," the mobile terminal 10 shifts back to the state of "under transition to Wi-Fi network" (S43). In this case, the mobile terminal 10 may return to the level before transition, or may redo the processing at the transition level 1.

Similarly, when the mobile terminal 10 detects that congestion is cleared after the mobile terminal 10 shifts from the state of "connecting to Wi-Fi network" to the state of "load balancing," the mobile terminal 10 shifts back to the state of "connecting to Wi-Fi network" (S44). In this case, the mobile terminal 10 may return to the level before transition, or may redo the processing at the transition level 1.

Blocking Wi-Fi Connection

The state of blocking Wi-Fi connection is the state of preventing new sockets of the application from being distributed to the Wi-Fi network. The mobile terminal 10 shifts to this state when the speed in the backbone network between a Wi-Fi network access point and the server is not sufficiently high and/or when the speed is lowered. Even in the case of executing communication of the application registered in the target application list, data transmission is performed not through the Wi-Fi network but through the mobile network. More specifically, when the mobile terminal 10 shifts to this state, data transmission is performed by using the sockets of the mobile network regardless of the distribution ratio (transition level).

The mobile terminal 10 also monitors throughputs of data transmission using the Wi-Fi network performed by applications other than the applications registered in the target application list so as to check speed recovery in the Wi-Fi network. The mobile terminal 10 also monitors throughputs of the mobile network to check that the mobile network is not slower than the Wi-Fi network.

When the speed of the Wi-Fi network becomes equal to or higher than a lower limit and the blocking is cancelled, and/or when the mobile terminal 10 uses not the LTE network but the 3G network as the mobile network, the mobile terminal 10 shifts to the state of "checking Wi-Fi connection" (S45).

Transition Events

A description will now be given of the events generated in the mobile terminal 10 to implement the above-described state transition. FIG. 10 is an explanatory view illustrating the relation between the state transition of the mobile terminal and the events.

Event of Wi-Fi Checking Completion

As illustrated in FIG. 10, an event of "Wi-Fi checking completion" is issued when the Wi-Fi network is determined to be available.

The mobile terminal 10 issues this even when it can be confirmed that the Wi-Fi quality is in a specified level or higher and so the Wi-Fi quality is in an allowable range. If the event of "Wi-Fi checking completion" occurs while the mobile terminal 10 is in the state of "checking Wi-Fi network," the mobile terminal 10 shifts to the state of "under transition to Wi-Fi network."

Event of Public Wi-Fi Connection Completion

The event of "public Wi-Fi connection completion" is issued when an access point, which is a connection destination on the Wi-Fi network that is determined to be available, is a public Wi-Fi access point. The mobile terminal 10 issues this event if it is determined that the Wi-Fi quality is in the specified level or higher and is within an allowable range and if the Wi-Fi network to be connected is a public Wi-Fi network.

If the event of "public Wi-Fi checking completion" occurs while the mobile terminal 10 is in the state of "checking public Wi-Fi network," the mobile terminal 10 shifts to the state of "connecting to public Wi-Fi network." Whether or not the accessing network is a public Wi-Fi network can be determined based on the SSID and the like of the access point.

Event of Wi-Fi Transition Completion

The event of "Wi-Fi transition completion" is issued when the transition level is shifted to the maximum level from the levels 1 to 9.

If this event is issued while the mobile terminal 10 is in the state of "under transition to Wi-Fi network," the mobile terminal 10 shifts to the state of "connecting to Wi-Fi network," in which data transmission is performed by using only the Wi-Fi sockets.

Event of Wi-Fi Network Congestion

The event of "Wi-Fi network congestion" is issued when a Wi-Fi actual measurement throughput per socket becomes lower than a lower limit while being in the state of under transition to Wi-Fi network or in the state of connecting to Wi-Fi network.

If the event of "Wi-Fi network congestion" is issued in the state of "under transition to Wi-Fi network" or the state of "connecting to Wi-Fi network," the mobile terminal 10 shifts to the state of "load balancing." When the mobile terminal 10 is in the state of connecting to the public Wi-Fi network, the mobile terminal 10 resets the state and performs self-transition that continuously increases the Wi-Fi transition level.

Event of Wi-Fi Congestion Clearance

The event of "Wi-Fi congestion clearance" is issued when the Wi-Fi actual measurement throughput per socket becomes higher than the lower limit in the state of "load balancing." When this event is issued while the mobile terminal 10 is in the state of "load balancing," the mobile terminal 10 determines that the saturated state of the Wi-Fi network is relieved, and shifts to the state of "under transition to Wi-Fi network."

Event of Quality Degradation in Wi-Fi Network

This event is issued when the Wi-Fi quality, which is periodically confirmed in all the states, becomes lower than an allowed value. This event is also issued when the Wi-Fi quality has an abrupt drop.

When this event is issued while being in the respective states of "under transition to Wi-Fi network," "connecting to Wi-Fi network," "load balancing," and "connecting to public Wi-Fi network," the mobile terminal 10 determines that the Wi-Fi quality deteriorates to the level that the Wi-Fi network is unavailable, and shifts to the state of "checking Wi-Fi network."

Event of Quality Deterioration in Mobile Network

This event is issued when the quality of the mobile network, which is periodically confirmed, becomes lower than the allowed value.

When this event is issued while being in the state of "under transition to Wi-Fi network" or the state of "load balancing," the mobile terminal 10 determines that the mobile network is not available. Accordingly, the mobile terminal 10 shifts to the state of "connecting to Wi-Fi network" in which socket communication is performed by using only the Wi-Fi network.

Event of Mobile Network Congestion

This event is issued when it is detected that the mobile network is occupied by sockets. When this event is issued while the mobile terminal 10 is in the state of under transition to Wi-Fi network, the mobile terminal 10 increases the Wi-Fi transition level. Since the Wi-Fi transition level is increased, the Wi-Fi transition speed becomes faster as a result.

Event of Mobile Congestion Clearance

This event is issued when the sockets that occupy the mobile network are released. When this event is issued, the mobile terminal 10 does not perform any specific state transition.

Event of Wi-Fi Speed Deterioration

This event is issued when an effective throughput of the Wi-Fi network becomes lower than the specified value. For example, the specific value is 150 kbps in the former low range for 3G networks, 200 Kbps in the middle range for 3.5G networks, and 250 kbps in the high range for LTE networks and the like. A traffic during a definite period of time is specified as a threshold value in each network range, and when it is detected that the traffic is below the specified threshold value, this event is issued.

When this event is issued in the respective states of "under transition to Wi-Fi network," "connecting to Wi-Fi network," and "connecting to public Wi-Fi network," the mobile terminal 10 shifts to the state of "blocking Wi-Fi connection."

Event of Wi-Fi Speed Recovery

This event is issued when an effective throughput of the Wi-Fi network becomes more than the specified value. For example, the specific value is 350 kbps in the former low range for 3G networks, 400 Kbps in the middle range for 3.5G networks, and 450 kbps in the high range for LTE networks and the like.

This event is also issued when the throughput of the mobile network becomes lower than the actual measurement Wi-Fi throughput measured and stored at the time of shifting to the state of blocking Wi-Fi connection. When this event is issued in the state of "blocking Wi-Fi connection", the mobile terminal 10 shifts to the state of "checking Wi-Fi network."

Event of Wi-Fi AP Switchover

This event is issued when an access point to the Wi-Fi network in connection is switched to another access point. When this event is issued, the mobile terminal 10 in any state shifts to the state of "checking Wi-Fi network."

Effect

Thus, the mobile terminals such as smartphones already include the unit that connects to two or more networks. It is possible, therefore, to simultaneously connect to a plurality of networks. As described in the foregoing, the mobile terminal 10 is provided with the function of distributing communication data, which come from a single or a plurality of communication applications, in units of a socket. At the occurrence of communication by the communication applications, the mobile terminal 10 transmits and receives the communication data on the respective networks in units of a socket.

The mobile terminal 10 allocates a next socket communication to the network that has responded faster. If one network does not respond for a definite period of time after data is transmitted thereto, transmission processing with respect to this network is stopped and another network is used to retransmit the interrupted data. In each application, the ratio of distributing sockets to the respective networks may be changed. When one socket is used to continuously transmit a fixed volume of data in one specific communication, other communications may be performed in another network.

As described in the foregoing, since communication data is distributed to the respective networks in units of a socket, the mobile terminal 10 can make a maximum use of a plurality of networks and can provide the user with seamless switchover of communication channels without the stress caused by the switchover. This makes it possible to enhance user convenience.

[b] Second Embodiment

While an example using the Wi-Fi network has been described in the first embodiment, the same processing may apply in the case where a WiMAX network is used. Accordingly, an example of using the WiMAX network will be described in the second embodiment.

Figure 11:
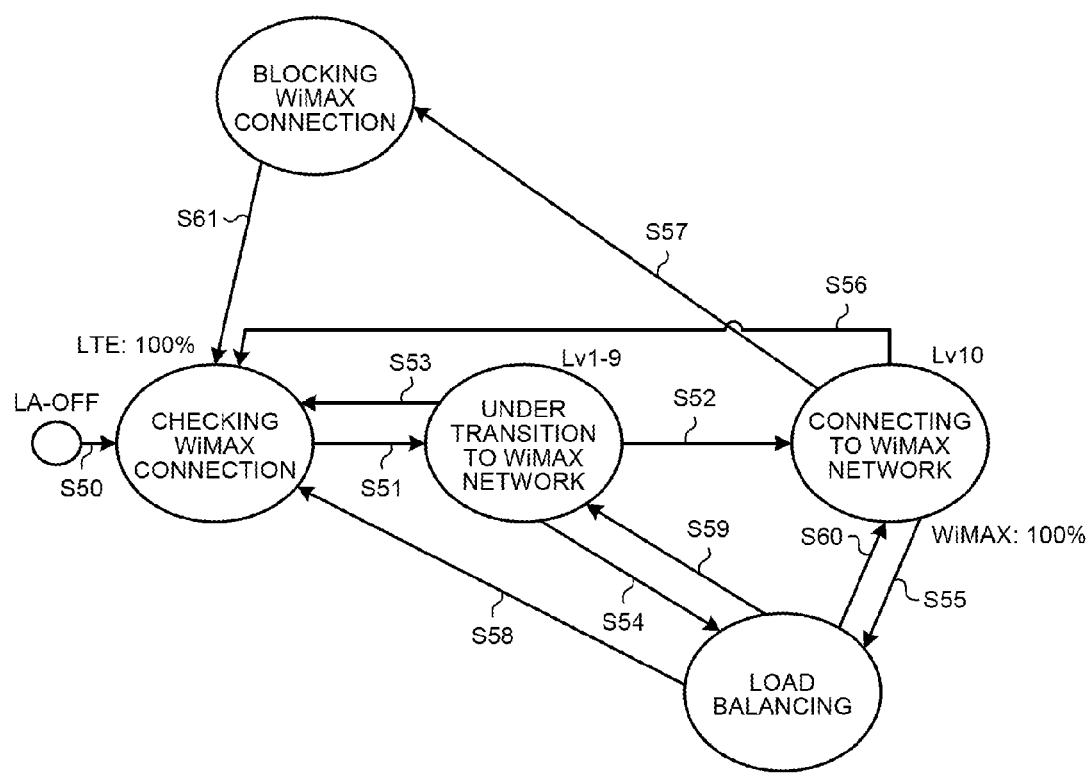
FIG. 11 is an explanatory view illustrating the state transition of the mobile terminal in the case of using a Worldwide Interoperability for Microwave Access (WiMAX) network.

FIG. 11 is an explanatory view illustrating the state transition of the mobile terminal by using the WiMAX network. As illustrated in FIG. 11, the state of the mobile terminal 10 changes in accordance with the radio conditions of the WiMAX network and/or the LTE network. The state of the mobile terminal 10 includes checking WiMAX connection, under transition to WiMAX network, load balancing, connecting to WiMAX network, and blocking WiMAX connection. The respective states, their transition conditions, and the like will be described.

Checking WiMAX Connection

The mobile terminal 10 shifts to the state of checking WiMAX connection after the mobile terminal 10 is started (S50). In this state, all the communications of the applications included in the target application list are distributed to the LTE network. In other words, the number of WiMAX sockets: the number of LTE sockets=0:10 in this state.

In this state, the mobile terminal 10 checks whether or not information on the WiMAX network has been acquired, and whether or not the WiMAX quality is in an allowable range. The mobile terminal 10 maintains the state of checking WiMAX connection until the above check items are checked. When it is detected that the quality of the connected WiMAX network is equal to or higher than a lower limit, the mobile terminal 10 shifts to the state of "under transition to WiMAX network" (S51).

Under Transition to WiMAX Network

In the state of under transition to WiMAX network, a usage rate of the WiMAX network is gradually increased until the mobile terminal establishes a complete connection to the WiMAX network. The WiMAX transition level starts at the level 1 and is increased to the level 10 in the end. More specifically, in this state, the WiMAX transition level is increased and the number of WiMAX sockets is increased as the above-stated quality of the WiMAX network is getting better.

When a certain transition level is used, for example, 10 times in a row for distribution, the mobile terminal 10 increases the level by 1 for distribution. Generally, the mobile terminal 10 determines the quality of the WiMAX network every 10 sockets and increases the level by one level at a time. However, in the case where the RSSI and the link speed of the WiMAX network exceed specified values, the transition level may be increased by two or three levels at a time (S52). More specifically, when the WiMAX quality is sufficiently high in spite of the low level, the mobile terminal 10 increases the level by a large increment in order to achieve swift switchover to the WiMAX network.

When the quality deteriorates after the transition level is increased, the mobile terminal 10 decreases the transition level by 1, whereas when the WiMAX quality deteriorates such that the throughput decreases by a specified value or more in two seconds, the mobile terminal 10 shifts to the state of "checking WiMAX connection" (S53). When transmission of data having a specified volume or more is performed by using the WiMAX sockets, the mobile terminal 10 shifts to the state of "load balancing" (S54).

Connecting to WiMAX Network

In the state of connecting to WiMAX network, all the communications of the applications included in the target application list are distributed to the WiMAX network. In this state, the mobile terminal 10 is in a complete connection to the WiMAX network, and communication is constantly performed at an off-load rate (WiMAX usage rate) of 100%. In other works, the number of WiMAX sockets: the number of LTE sockets=10:0 in this state.

When transmission of the data having a specified volume or more is performed by using the WiMAX sockets in this state, the mobile terminal 10 shifts to the state of "load balancing" (S55). When the throughput and the link speed of the WiMAX network become lower than specified values, or when the throughput decreases by a specified value or more in two seconds, the mobile terminal 10 shifts to the state of "checking WiMAX connection" (S56). When the WiMAX quality becomes lower than the lower limit, the mobile terminal 10 shifts to the state of "blocking WiMAX connection" (S57).

Load Balancing

In the state of load balancing, some of the WiMAX communications are assigned to the mobile network, such as the LTE network, to distribute the load of the WiMAX network. More specifically, in this state, data of a large volume is transmitted in a certain WiMAX socket communication and this causes congestion of the WiMAX network.

In this state, the number of WiMAX sockets: the number of LTE sockets=0:10. More specifically, the mobile terminal 10 transmits data subsequent to the congestion-causing data by using sockets of the mobile network even if the WiMAX sockets are allocated thereto.

When the mobile terminal 10 is using not the LTE network but the 3G network as the mobile network at the timing of the mobile terminal 10 shifting to the state of "load balancing," the mobile terminal 10 shifts to the state of "checking WiMAX connection" (S58).

When the mobile terminal 10 detects that congestion is cleared after the mobile terminal 10 shifts from the state of "under transition to WiMAX network" to the state of "load balancing," the mobile terminal 10 shifts back to the state of "under transition to WiMAX network" (S59). In this case, the mobile terminal 10 may return to the level before transition, or may redo the processing at the level 1.

Similarly, when the mobile terminal 10 detects that congestion is cleared after the mobile terminal 10 shifts from the state of "connecting to WiMAX network" to the state of "load balancing," the mobile terminal 10 shifts back to the state of "connecting to WiMAX network" (S60). In this case, the mobile terminal 10 may return to the level before transition, or may redo the processing at the level 1.

Blocking WiMAX Connection

The state of blocking WiMAX connection is the state of preventing new sockets of the application from being distributed to the WiMAX network. The mobile terminal 10 shifts to this state when the WiMAX speed is lowered. Even in the case of executing a communication of the application registered in the target application list, data transmission is performed not through the WiMAX network but through the mobile network.

The mobile terminal 10 also monitors throughputs of data transmission using the WiMAX network performed by applications other than the applications registered in the target application list so as to check speed recovery in the WiMAX network. The mobile terminal 10 also monitors throughputs of the mobile network to check that the mobile network is not slower than the WiMAX network.

When the speed of the WiMAX network becomes equal to or higher than the lower limit and the blocking is cancelled, and/or when the mobile terminal 10 uses not the LTE network but the 3G network as the mobile network, the mobile terminal 10 shifts to the state of "checking WiMAX connection" (S61).

Thus, the mobile terminal 10 can perform similar processing not only in the case of using the Wi-Fi network but also in the case of using the WiMAX network. In other words, the mobile terminal 10 can provide seamless network switchover independent of the configuration of the wireless LANs.

[c] Third Embodiment

While the embodiments of the present invention have been described so far, the present invention may be implemented in various modes different from the embodiments described above. Accordingly, different embodiments will be described below.

Communication Network

Although an example of the Wi-Fi network and the LTE network, as well as an example of the WiMAX network and the LTE network have been described, the present invention is not limited to these examples. For example, the transition level may be controlled by using three networks of the Wi-Fi network, the WiMAX network, and the LTE network. The timing of determining the transition level may arbitrarily be set such as every ten sockets and every fifty sockets.

Target Application

In the first embodiment, an example of storing the information on distribution target applications in the form of a target application list has been described. However, the present invention is not limited to this example. For example, the information on the applications other than the distribution target applications may be stored, and the applications other than the stored applications may be subjected to the distribution processing.

System

Furthermore, among the respective processings described in the present embodiment, all or part of the processings which have been described to be performed automatically may be performed manually. Or alternatively, all or part of the processings which have been described to be performed manually may be performed automatically by a publicly known method. In addition, the processing procedures, control procedures, specific names, and information including various kinds of data and parameters which have been disclosed in the above description and the drawings may arbitrarily be changed unless otherwise specified.

Furthermore, the respective component members of each illustrated apparatus are functional concepts, and their physical constitution may be different from those illustrated in the drawings. In other words, a concrete distribution and/or dispersion form of each apparatus is not limited to those illustrated in the drawings. In short, each apparatus may be configured by functionally or physically distributing and dispersing the whole or part of each apparatus in arbitrary units depending on various kinds of loads, use conditions, and the like. Furthermore, the whole or an arbitrary part of the respective processing functions performed in each apparatus may be implemented by a CPU or programs that are analyzed and executed by the CPU, or may be implemented as wired-logic-based hardware.

According to one aspect of this application, the user convenience can be enhanced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus, comprising:
a memory, and
a processor connected to the memory wherein the processor executes a process comprising:
   transmitting data through a first communication network upon detecting that a simultaneous connection through both of the first communication network and a second communication network has not been established;
   measuring a first wireless quality that is a wireless quality of the first communication network and a second wireless quality that is a wireless quality of the second communication network upon detecting that the simultaneous connection is established;
   determining a ratio between the number of first sockets used for the first communication network and the number of second sockets used for the second communication network, based on the first wireless quality or the second wireless quality; and
   generating the first sockets and the second sockets at the ratio determined at the determining and transmitting data by using each of the generated sockets, wherein the first sockets and the second sockets comprise wireless Local Area Network (LAN) sockets and mobile network sockets.

2. The wireless communication apparatus according to claim 1, wherein
the measuring includes calculating, in each application, average throughputs of the first communication network when a predetermined number of data sets are transmitted through the first communication network and average throughputs of the second communication network when a predetermined number of data sets are transmitted through the second communication network, and
the determining includes increasing the number of the first sockets from previous number when the average throughput of the first communication network, which is higher in speed than the second communication network, is improved from a previous average throughput, and decreasing the number of the second sockets from previous number.

3. The wireless communication apparatus according to claim 2, wherein, when the average throughput of the first communication network is reduced from the previous average throughput, the determining includes decreasing the number of the first sockets from the previous number and increasing the number of the second sockets from the previous number.

4. The wireless communication apparatus according to claim 1, wherein the process further comprises retransmitting, when a communication error occurs in data transmission using the first sockets or the second sockets, data which is transmitted in the data transmission in which the communication error occurred using sockets of the communication network different from the communication network used at occurrence of the communication error.

5. The wireless communication apparatus according to claim 1, wherein the process further comprises transmitting, when transmission of data having a specified volume or more is performed by using the first sockets or the second sockets, subsequent data by using the sockets of the communication network different from the communication network used in transmission of the data having the specified volume or more until the transmission of the data having the specified volume or more is completed.

6. A wireless communication method comprising:
transmitting data through a first communication network upon detecting that a simultaneous connection through both of the first communication network and a second communication network has not been established;
measuring a first wireless quality that is a wireless quality of the first communication network and a second wireless quality that is a wireless quality of the second communication network, using a processor upon detecting that the simultaneous connection is established;
determining a ratio between the number of first sockets used for the first communication network and the number of second sockets used for the second communication network, based on the first wireless quality or the second wireless quality, using the processor; and
generating the first sockets and the second sockets at the determined ratio and transmitting data by using each of the generated sockets, using the processor, wherein the first sockets and the second sockets comprise wireless Local Area Network (LAN) sockets and mobile network sockets.

7. A non-transitory computer-readable recording medium having stored therein a wireless communication program causing a computer to execute a process comprising:
transmitting data through a first communication network upon detecting that a simultaneous connection through both of the first communication network and a second communication network has not been established;
measuring a first wireless quality that is a wireless quality of the first communication network and a second wireless quality that is a wireless quality of the second communication network upon detecting that the simultaneous connection is established;
determining a ratio between the number of first sockets used for the first communication network and the number of second sockets used for the second communication network, based on the first wireless quality or the second wireless quality; and
generating the first sockets and the second sockets at the determined ratio and transmitting data by using each of the generated sockets, wherein the first sockets and the second sockets comprise wireless Local Area Network (LAN) sockets and mobile network sockets.

* * * * *